(12) United States Patent
Martin et al.

(10) Patent No.: US 7,791,239 B2
(45) Date of Patent: Sep. 7, 2010

(54) ROTOR WITH CLAMPING DEVICE

(75) Inventors: Jürgen Martin, Regensburg (DE); Helmut Sopp, Fladungen (DE)

(73) Assignee: Siemens Aktiengesellschaft, München (DE)

( * ) Notice: Subject to any disclaimer, the term of this patent is extended or adjusted under 35 U.S.C. 154(b) by 465 days.

(21) Appl. No.: 11/576,018

(22) PCT Filed: Sep. 19, 2005

(86) PCT No.: PCT/EP2005/054642
§ 371 (c)(1),
(2), (4) Date: Dec. 18, 2007

(87) PCT Pub. No.: WO2006/032640
PCT Pub. Date: Mar. 30, 2006

(65) Prior Publication Data
US 2008/0203843 A1    Aug. 28, 2008

(30) Foreign Application Priority Data
Sep. 24, 2004   (DE) .................. 10 2004 046 440

(51) Int. Cl.
*H02K 1/28* (2006.01)
(52) U.S. Cl. .................. 310/156.22; 310/156.08; 310/156.12
(58) Field of Classification Search .......... 310/156.08, 310/156.22, 156.01, 156.11, 156.12, 156.18
See application file for complete search history.

(56) References Cited

U.S. PATENT DOCUMENTS

| | | | | |
|---|---|---|---|---|
| 2,255,477 A | | 10/1938 | Tognola | |
| 2,200,126 A | * | 5/1940 | Smith | 310/211 |
| 2,515,303 A | * | 7/1950 | Isnard | 403/254 |
| 3,484,635 A | * | 12/1969 | MacKallor, Jr. | 310/266 |
| 3,830,577 A | * | 8/1974 | Rampe et al. | 403/378 |
| 3,832,584 A | * | 8/1974 | DePaul | 310/211 |
| 4,367,053 A | | 1/1983 | Stratlenko et al. | |
| 4,591,749 A | * | 5/1986 | Gauthier et al. | 310/156.19 |
| 4,967,111 A | * | 10/1990 | Andrieux et al. | 310/90 |
| 5,111,094 A | * | 5/1992 | Patel et al. | 310/156.22 |
| 5,574,323 A | * | 11/1996 | Nusser | 310/156.22 |
| 5,801,470 A | | 9/1998 | Johnson et al. | |
| 5,907,208 A | * | 5/1999 | Kristen et al. | 310/216.115 |
| 7,355,310 B2 | * | 4/2008 | Kashihara et al. | 310/156.12 |
| 7,565,731 B2 | * | 7/2009 | Oximberg et al. | 29/598 |
| 7,649,293 B2 | * | 1/2010 | Maldener et al. | 310/156.22 |

(Continued)

FOREIGN PATENT DOCUMENTS

DE   569 457   12/1930

(Continued)

*Primary Examiner*—Burton Mullins
(74) *Attorney, Agent, or Firm*—Henry M. Feiereisen; Ursula B. Day

(57) ABSTRACT

Manufacturing costs of releasable permanent magnet rotors or asynchronous squirrel cages should be reduced. Accordingly, a rotor is proposed which includes at least one ring-shaped fastening device (23) secured in fixed rotative engagement to one of the end faces of a magnet device (21, 22) and for form-fitting or force-locking connection to a shaft (25). This makes it possible to eliminate the need for a special bearing sleeve, and the laminated armature core (21) can be provided with a larger axial hole diameter. As a result, the minimum joint pressure can be reduced so that deformations of the spindle and complicated refinishing processes can be avoided. In addition, less stringent manufacturing tolerances of the spindle (25) can be selected.

9 Claims, 5 Drawing Sheets

U.S. PATENT DOCUMENTS

| | | | |
|---|---|---|---|
| 2005/0073216 A1* | 4/2005 | Mitcham | 310/270 |
| 2006/0158053 A1* | 7/2006 | Aschoff et al. | 310/91 |
| 2007/0138889 A1* | 6/2007 | Maldener et al. | 310/156.22 |

FOREIGN PATENT DOCUMENTS

| | | |
|---|---|---|
| DE | 647 315 | 1/1931 |
| DE | 891 410 | 6/1943 |
| DE | 1 870 075 | 4/1963 |
| DE | 102 872 | 12/1973 |
| DE | 28 11 501 | 9/1979 |
| DE | 29 32 636 | 2/1981 |
| DE | 42 39 754 | 1/1995 |
| DE | 44 23 840 | 1/1996 |
| GB | 2205002 | * 11/1988 |
| JP | 5-292699 | * 11/1993 |
| WO | WO 94/03959 A1 | 2/1994 |

* cited by examiner

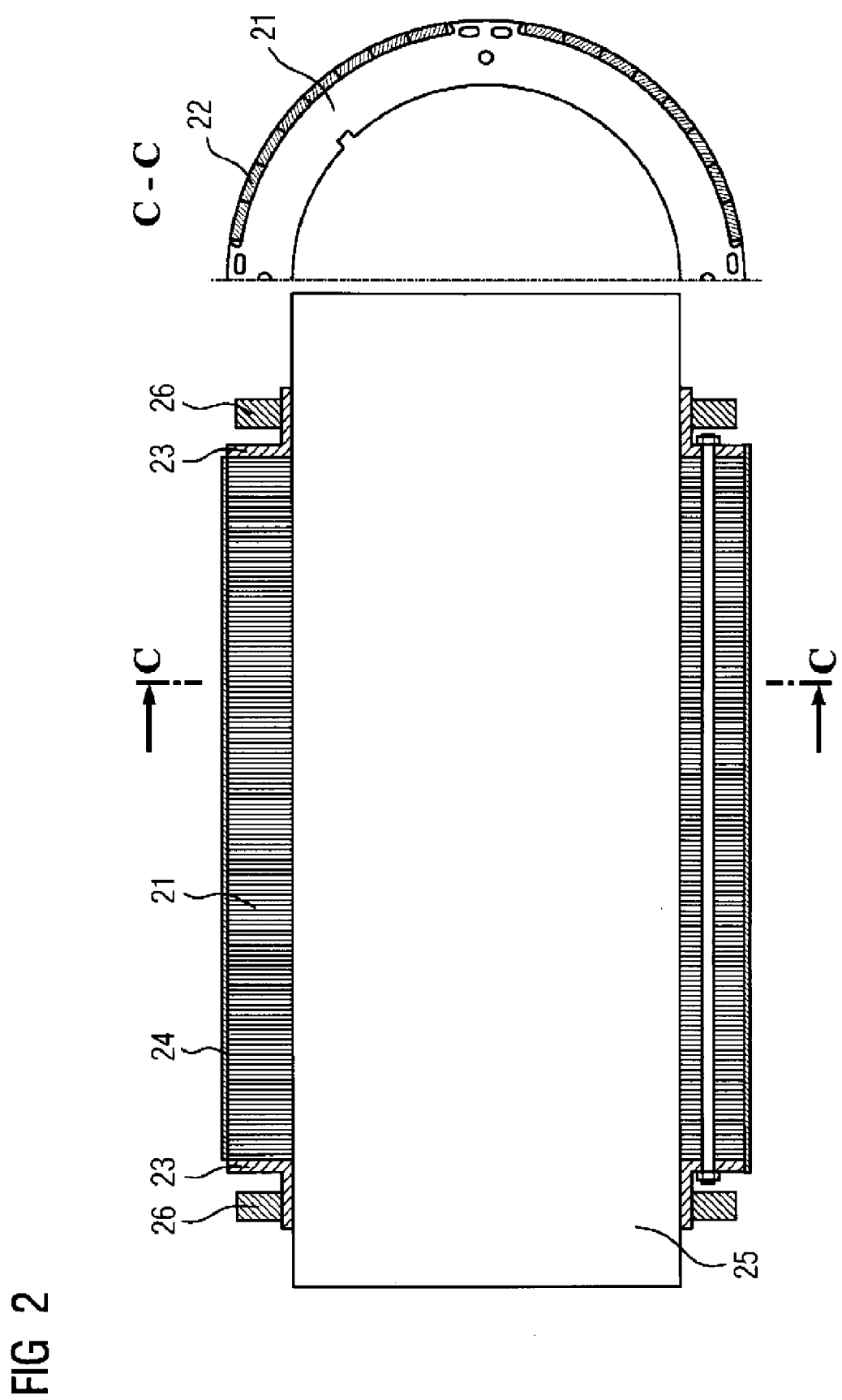

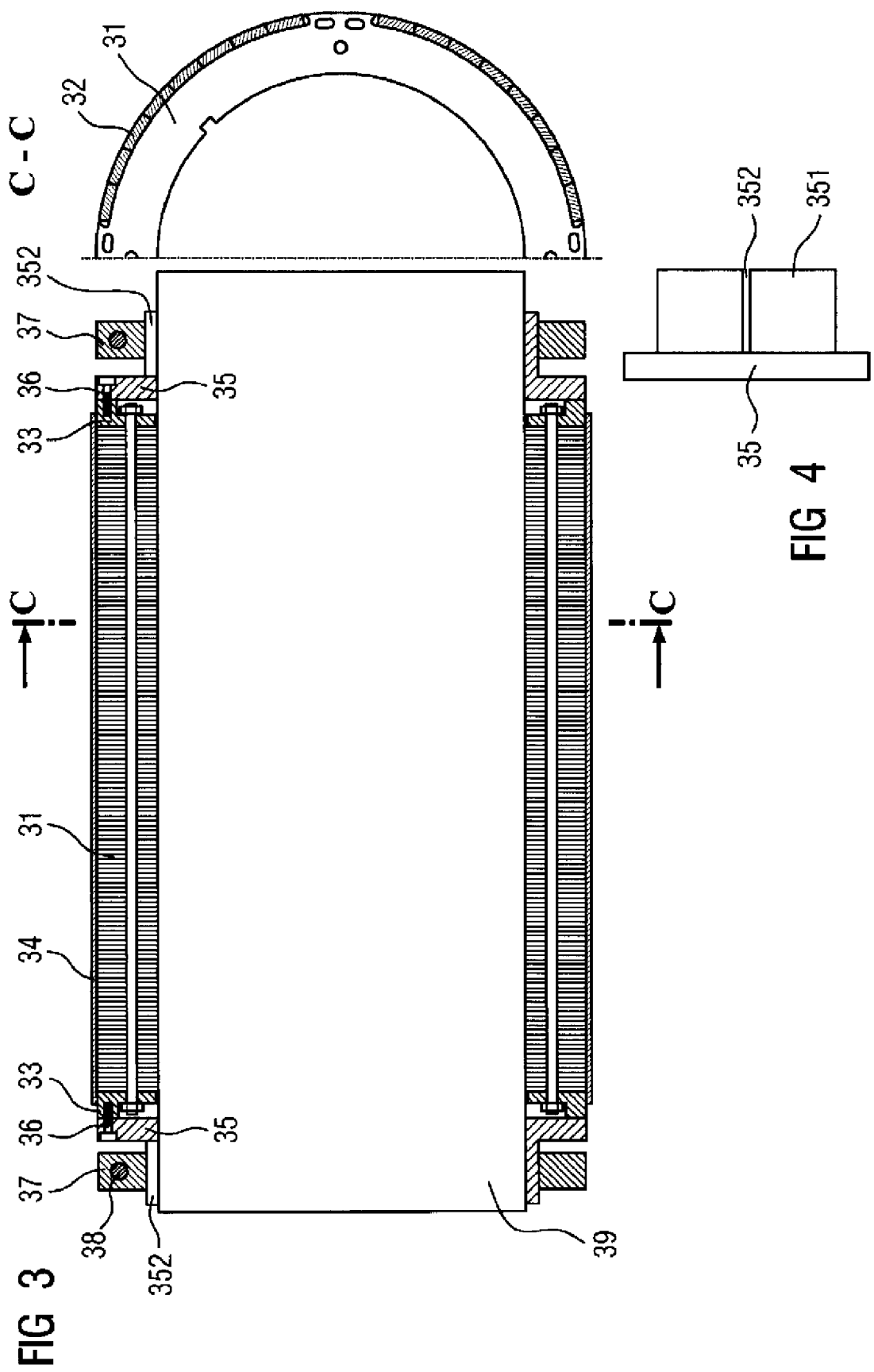

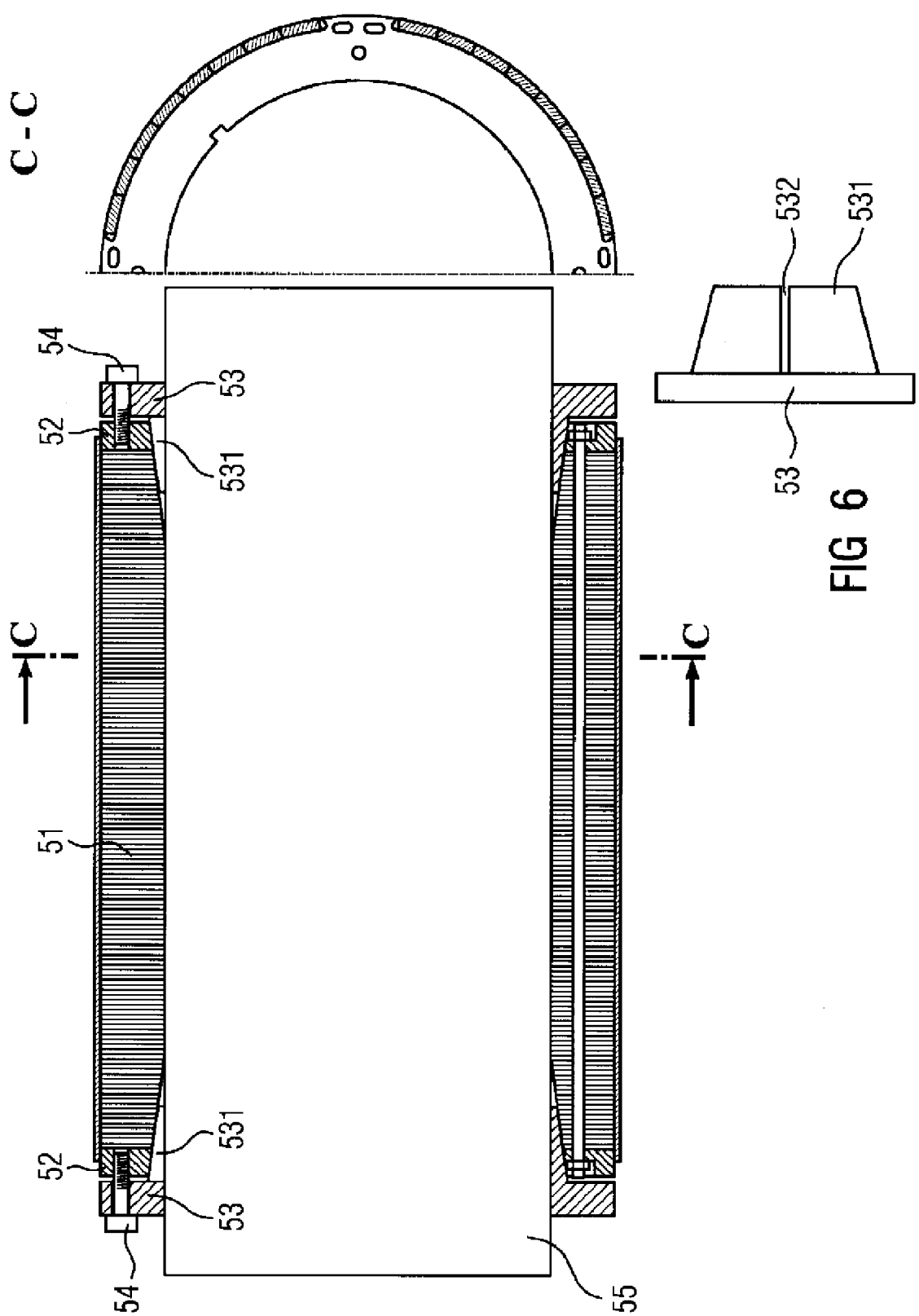

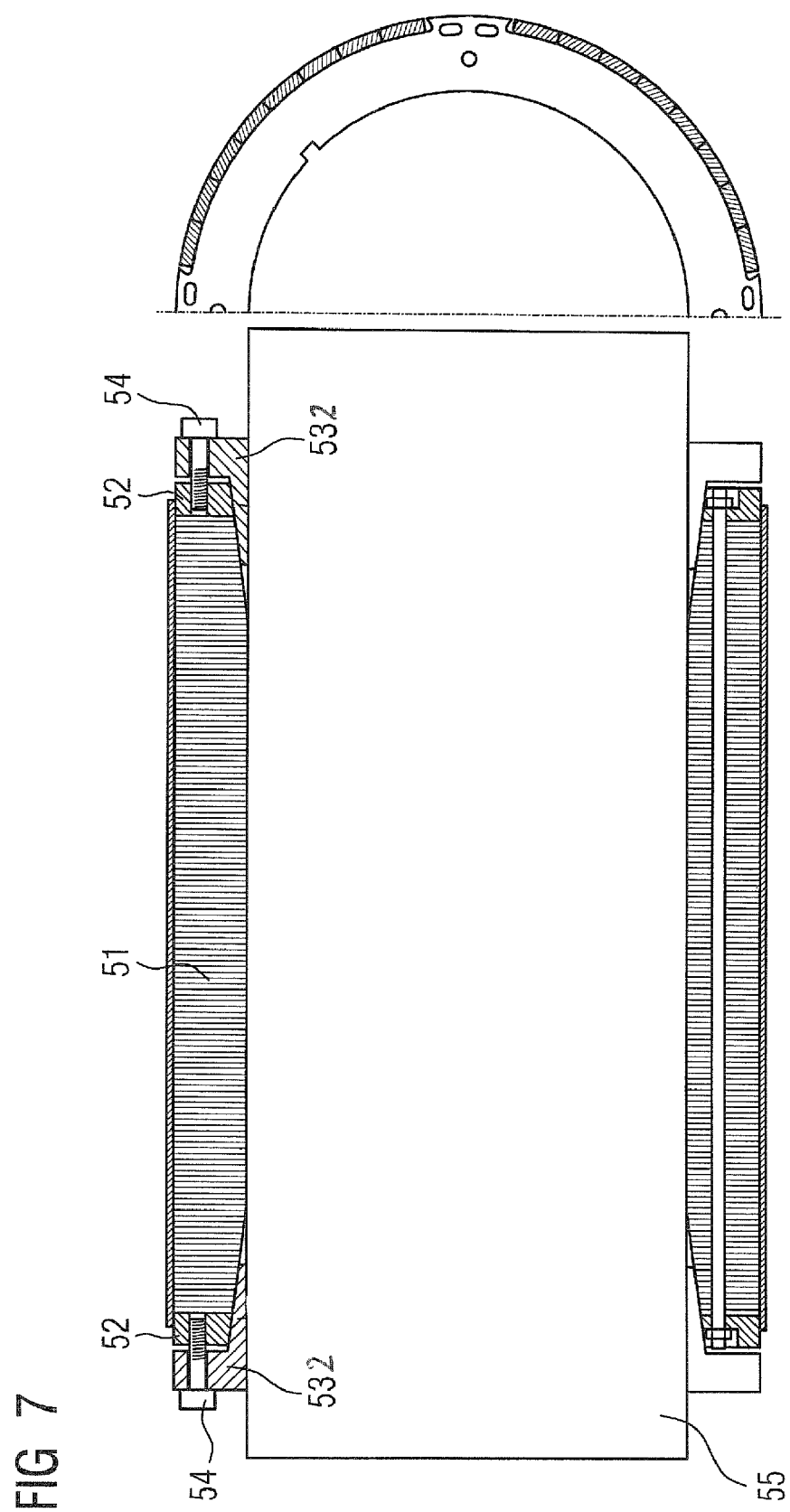

ROTOR WITH CLAMPING DEVICE

BACKGROUND OF THE INVENTION

The present invention relates to a permanent magnet rotor or an asynchronous squirrel-cage rotor with a hollow cylindrical magnet device which has permanent magnets and which is releasably mountable again on a shaft.

Sleeveless permanent magnet rotors are normally mounted upon a spindle shaft through friction fit by means of thermal joining for play-free torque transmission. As a result of the friction fitting or force locking joint, a detachment becomes impossible or is possible only by an accompanied impairment of the armature. Detachable units require sleeve configurations in which the laminated armature core, including the permanent magnets or the squirrel-cage, are mounted onto a sleeve. Such a rotor is illustrated in FIG. 1. The laminated armature core 1 including the permanent magnets is arranged radially above the armature sleeve 2. The armature sleeve 2 is constructed as oil-press joint in order to be able to detach the rotor from the spindle shaft again through use of oil pressure. The sleeve 2 includes hereby oil inlet bores 3. In such an armature sleeve 2, the axle hole diameter of the laminated armature core is reduced to the inner diameter D of the armature sleeve 2. Thus, the static and dynamic stiffness of the motor spindle decreases as a result of the limitation of the shaft outer diameter and limits the maximally attainable bar passage. In addition, the torque transmission requires a minimum joint pressure because a certain minimum torque should be transmitted across the force-locking connection between armature sleeve 2 and spindle shaft. The transmittable torque is defined by the joint force multiplied by the contact pressure surface. As a consequence, the joint pressure can be reduced at greater contact pressure surface, i.e. at greater axle hole diameter, and the maximum joint pressure resulting as a consequence of manufacturing tolerances can be reduced through adjustable clamping.

The compression or the joint pressure may cause a deformation of the shaft or of the work spindle, which deformation requires extensive refinishing work. For manufacturing reasons, the actual joint pressure is obtained from the minimum joint pressure and the pressure encountered in addition by the finishing tolerance of the shaft and the finishing tolerance of the sleeve. As a result, the joint pressure is subjected to very wide fluctuations which together with a resultant shaft deformation can be coped with only with great difficulty.

In order to be able to better manage the deformations of the shaft and to reduce the manufacturing and assembly costs, a stepped compression is applied between armature sleeve 2 and shaft, as indicated in FIG. 1 by the shaping of the inside surface area of the armature sleeve 2. Both end zones have hereby a compression zone 4, 5, respectively, which must have the stringent dimensional tolerances for the compression. It is easy to recognize that such a rotor, detachable from the shaft, can be manufactured only at substantial manufacturing costs and that the sleeve limits the outer shaft diameter.

SUMMARY OF THE INVENTION

It is therefore the object of the present invention to propose a permanent magnet rotor or asynchronous rotor which can easily be releasably mounted onto a shaft and produced at reduced manufacturing costs and which permits a greatest possible outer shaft diameter and/or inner shaft diameter in the area of the core seat and improves the concentric running quality of the shaft as a result of minimized joint pressures.

This object is attained in accordance with the invention by a rotor having a hollow-cylindrical magnet device which includes permanent magnets or shorting bars and which is releasably securable upon a shaft, and at least one ring-shaped fastening device connected in fixed rotative engagement to one of the end faces of the magnet device or rotor and for form-fitting or force-locking connection with the shaft.

This fastening device attachable to the end faces of the magnet device or rotor for moment transmission permits a greater axle hole diameter and thus a decreased minimum joint pressure. As a consequence, it is not only possible to use a spindle with greater static and dynamic stiffness but the deformation of the spindle shaft is also greatly reduced as a result the decreased joint pressure.

Preferably, the fastening device includes at least one bolt by which a clamping force is applied. In other words, there is no need to realize the clamping force through provision of fits that are difficult to manufacture.

The fastening device may further include a clamping sleeve for securement upon the magnet device, and a clamping disk for clamping the clamping sleeve upon the shaft. As a result, very simple components are provided for clamping so that an end consumer is able to mount the respective rotor onto the respective spindle and there is no need to involve the manufacturer.

Furthermore, the clamping sleeve can be realized as angle disk. Such a disk can be manufactured in a very cost-efficient manner.

According to a particular embodiment, the clamping sleeve may further be fixedly connected to the magnet device. In this case, the user has to merely attach the clamping disk onto the clamping sleeve in order to secure the rotor upon the shaft.

According to a further embodiment of the present invention, the clamping sleeve is slotted. This has the advantage that the clamping force can be reduced by the clamping disk because the components of the sleeve are able to more easily bear upon the shaft.

According to an alternative embodiment, the fastening device merely includes about the circumference a ring which is slotted in axial direction, similar to the clamping disk, which, however, is firmly mounted or mountable to the laminated armature core. Thus, the need for a further part, namely clamping sleeve or clamping disk, can be eliminated.

According to a further embodiment, the fastening device may include a clamping sleeve which has a cone-shaped portion that can be compressed between the magnet device and the shaft so as to realize a force-locking engagement between both components. In this way, axial installation space in particular can be gained.

The clamping sleeve may further assume the function of a tare disk for compensating imbalances. Thus, the need for a particular tare disk can be eliminated.

BRIEF DESCRIPTION OF THE DRAWING

The present invention is described in greater detail with reference to the attached drawings, in which:

FIG. 2 shows a sleeveless and detachable rotor according to the invention with firmly attached clamping sleeve;

FIG. 3 shows a permanent magnet rotor with attachable clamping sleeve;

FIG. 4 shows a side view of a slotted clamping sleeve;

FIG. 5 shows a permanent magnet rotor according to the invention with cone-shaped clamping sleeve;

FIG. 6 shows a side view of the cone-shaped clamping sleeve of FIG. 5; and

FIG. 7 shows a permanent magnet rotor according to the invention with slotted clamping ring.

DETAILED DESCRIPTION OF PREFERRED EMBODIMENTS

Figure 1:
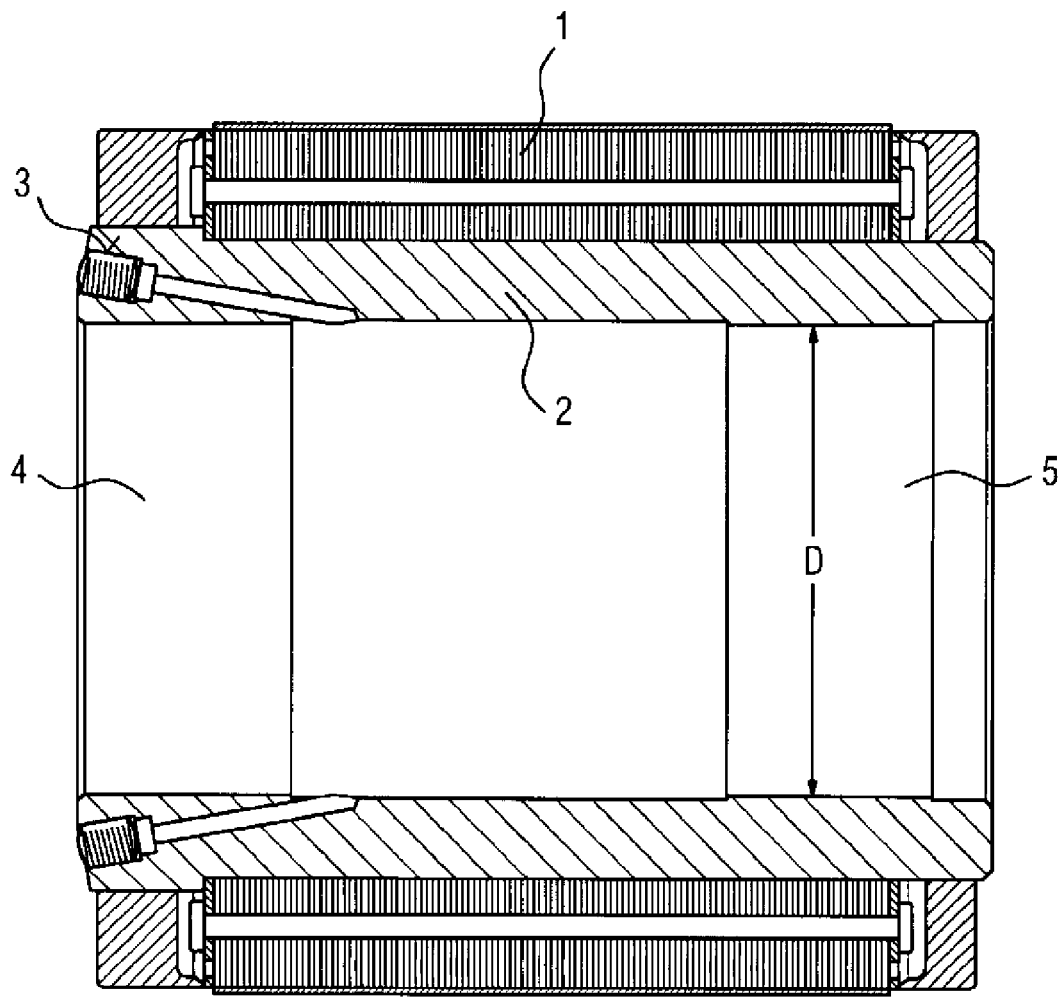
FIG. 1 shows a detachable rotor with bearing sleeve according to the state of the art.

The exemplified embodiments, as described in greater detail hereinafter, represent preferred embodiments of the present invention.

The general idea of the invention is based on the form-fitting or force-locking attachment of the magnet device of an armature, i.e. the laminated armature core, including the permanent magnets, to a shaft by means of a fastening device without sleeve. As a result, the use of simple attachments flanges enables the implementation of a play-free torque transmission as well as the realization of an armature unit which can be mounted and dismantled at room temperature without particular tools.

According to a first embodiment shown in FIG. 2, the laminated armature core 21, which supports permanent magnets 22 about its circumference according to the sectional view C-C, has end faces for respective attachment of a clamping sleeve 23 which is constructed as a sheet-metal part and configured in the shape of an angle disk. This clamping disk also assumes the function of an armature end plate, as shown in the lower half of FIG. 2.

An outer wrap 24, which embraces the permanent magnets 22, is not shown in the sectional view C-C for sake of simplicity.

The securement of both clamping sleeves 23 upon a shaft 25 is realized by clamping disks 26 which force the axially extending portion of each clamping sleeve 23 upon the shaft 25 and thus apply the necessary joining force. As an alternative, the clamping sleeve 23 may also be connected directly, e.g. by means of bolts, with the shaft (force-locking radial bolting).

The clamping sleeve may, optionally, be slotted. In other words, the portions extending in axial direction of the laminated armature core 21 or shaft 25 are slotted on their circumference once or several times in axial direction. As a result, the individual portions of the clamping sleeve 23 can be pressed more easily upon the shaft 25 so that the tension force of the clamping disk 26 can be reduced.

Since it is now possible to omit the use of an armature sleeve, the useful axle hole diameter is enlarged. Further advantages of this construction are the capability to mount and dismantle the armature onto the shaft without changes to the geometry. Further, the force transmission is realized free of play.

In view of the minimized clamping action, a more beneficial deformation ratio is established, thereby significantly improving the concentric running quantity of the spindle shaft.

The clamping disk 26 may be designed open or closed. An open clamping disk is slotted and its tension force is generated by a bolt for example. Higher rotation speeds are, however, advantageous, when the clamping disk is designed closed.

FIG. 3 shows a second embodiment of the present invention. The laminated armature core 31, which carries the permanent magnets 32 about its circumference, is closed here at the end faces by armature end plates 33. The sectional view C-C again omits the illustration of the outer wrap 34. A clamping sleeve 35, as shown in detail in FIG. 4, is mounted to the armature end plates 33 by means of bolts 36.

According to FIG. 4, the clamping sleeve 35, which has an orientation in correspondence to the right clamping sleeve 35 of FIG. 3, is slotted. In other words, its axial portion 351 has at least one slot 352 in axial direction. This slot 352 is also shown in the upper half of FIG. 3 while being invisible in the lower half. Like in the first embodiment, a clamping disk 37 is respectively attached onto the slotted part 351 of the clamping sleeve 35. These clamping disks 37 can be respectively tensioned by bolts 38. They force hereby the slotted parts 351 onto the spindle shaft 39.

The inner surface of the clamping sleeves 35 has a finished configuration. The armature may be equipped in the factory with these clamping sleeves 35, or subsequently attached by the customer. They centered disposition of the armature is ensured by the dimensional tolerance and shape tolerance and the axle hole bore. The torque transmission in the laminated armature core 31 is realized, as in the preceding example, by gluing the metal sheets (e.g. self-bonding lacquer), via tie-rods, via form-fitting elements, or via an outer wrap, and the like.

A further embodiment of the present invention is shown in FIGS. 5 and 6. The components, shown there, correspond essentially to those of the preceding exemplified embodiments. Therefore, the following description relates in greater detail only to the differently configured components. The laminated armature core 51 is conically shaped on both its end faces including the armature end plates 52. The axially extending portions 531 of the clamping sleeves 53 are also conically shaped. In this exemplary embodiment, these axially extending portions 531 are pushed underneath the laminated armature core 51. The corresponding force is applied by bolts 54 which are threadably engaged through the clamping sleeve 53 into the armature end plates 52. The further the clamping sleeves 53 are threadably engaged into the armature end plates 52, the more they press against the shaft 55. Also in this case, it is beneficial when the clamping sleeve 53 is designed slotted and includes corresponding slots 532. In the involved exemplified embodiments, the clamping sleeves may further be designed with inner and/or outer threads.

The clamping sleeve may be joined with or without play, or without or with pressure onto the spindle. As an alternative, instead of the clamping sleeve, the fastening device may also use an engagement sleeve which is connected with the spindle formfittingly, e.g. through embossments, PF-hub keyway, etc. A variation of FIG. 5 is illustrated in FIG. 7 in which the fastening device includes a clamping ring 532 which is slotted in axial direction and constructed for direct securement to the magnet device 51.

Furthermore, the clamping sleeves may be designed for connection with the armature core with stepped seats for easier assembly for example, i.e. inner diameter of the first clamping sleeve< inner diameter of the armature bore< inner diameter of the second clamping sleeve. The union may, however, also be configured with the geometry inner diameter of the first clamping sleeve = inner diameter of the armature bore= inner diameter of the second clamping sleeve.

The force flow from stator up to the spindle or shaft extends via the following components: stator, rotor core, optionally, armature end plates, clamping sleeves, and spindle. The force flow in the armature core is realized successively via the core with tie rods, or via a fiber composite sleeve upon the clamping sleeves. It may, however, also be directed in parallel via the tie rods and the fiber composite sleeve or by means of other core fastenings (e.g. welded, glued, or similarly shaped core) onto the clamping sleeves. The force flow may further be supported, for example, through slight interference fit of the core, e.g. through oversized fit or elastic form elements, like O rings underneath the core seat.

What is claimed is:

1. A rotor for an electric machine, comprising:
a hollow-cylindrical magnet device adapted for detachable securement onto a shaft; and
at least one ring-shaped fastening device secured in fixed rotative engagement to an end face of the magnet device and formfittingly connected or forced into engagement with the shaft, said fastening device including a clamping sleeve constructed for securement upon the magnet device and including a slotted axial portion, which extends away from the magnet device, and a clamping disk placed on the axial portion of the clamping sleeve for clamping the clamping sleeve upon the shaft,
wherein the fastening device includes at least one bolt interacting with the clamping disk for applying a clamping force.

2. The rotor of claim 1, wherein the clamping sleeve is fixedly connected with the magnet device.

3. A rotor for an electric machine, comprising:
a hollow-cylindrical magnet device adapted for detachable securement onto a shaft; and
at least one ring-shaped fastening device secured in fixed rotative engagement to an end face of the magnet device and formfittingly connected or forced into engagement with the shaft, said fastening device including a clamping sleeve constructed for securement upon the magnet device and including a slotted axial portion, which extends away from the magnet device, and a clamping disk placed on the axial portion of the clamping sleeve for clamping the clamping sleeve upon the shaft,
wherein the clamping sleeve is an angle disk.

4. The rotor of claim 3, wherein the clamping sleeve is fixedly connected with the magnet device.

5. A rotor for an electric machine, comprising:
a hollow-cylindrical magnet device adapted for detachable securement onto a shaft; and
at least one ring-shaped fastening device secured in fixed rotative engagement to an end face of the magnet device and formfittingly connected or forced into engagement with the shaft, said fastening device including a clamping sleeve constructed for securement upon the magnet device and including a slotted axial portion, which extends away from the magnet device,
wherein the clamping sleeve has a cone-shaped portion which can be wedged between the magnet device and the shaft so as to establish the forced engagement between the magnet device and the shaft.

6. The rotor of claim 5, wherein the clamping sleeve is constructed in the form of a clamping ring which is slotted in axial direction and constructed for direct securement to the magnet device.

7. The rotor of claim 5, wherein the clamping sleeve is fixedly connected with the magnet device.

8. A rotor for an electric machine, comprising:
a hollow-cylindrical magnet device adapted for detachable securement onto a shaft; and
at least one ring-shaped fastening device secured in fixed rotative engagement to an end face of the magnet device and formfittingly connected or forced into engagement with the shaft, said fastening device including a clamping sleeve constructed for securement upon the magnet device and including a slotted axial portion, which extends away from the magnet device, and a clamping disk placed on the axial portion of the clamping sleeve for clamping the clamping sleeve upon the shaft,
wherein the clamping sleeve is constructed to assume a function of a tare disk for compensating imbalances.

9. The rotor of claim 8, wherein the clamping sleeve is fixedly connected with the magnet device.

* * * * *